(12) United States Patent
Bragason et al.

(10) Patent No.: US 10,261,598 B2
(45) Date of Patent: Apr. 16, 2019

(54) AIRCRAFT AVIONICS DATA INPUT PANEL

(71) Applicant: Spectralux Corporation, Redmond, WA (US)

(72) Inventors: Steinarr Bragason, Hafnarfjordur (IS); Andy R. Hill, Basingstroke (GB); David E. Hiney, Woodinville, WA (US); Frank E. Hummel, Woodinville, WA (US); James A. Reynolds, Bothell, WA (US); Bryan L. Sammons, Kirkland, WA (US)

(73) Assignee: SPECTRALUX CORPORATION, Redmond, WA (US)

( * ) Notice: Subject to any disclaimer, the term of this patent is extended or adjusted under 35 U.S.C. 154(b) by 102 days.

(21) Appl. No.: 15/402,922

(22) Filed: Jan. 10, 2017

(65) Prior Publication Data
US 2017/0212604 A1    Jul. 27, 2017

Related U.S. Application Data

(60) Provisional application No. 62/281,501, filed on Jan. 21, 2016.

(51) Int. Cl.
*G06F 3/02* (2006.01)
*G06F 3/0489* (2013.01)
(Continued)

(52) U.S. Cl.
CPC ......... *G06F 3/0219* (2013.01); *G01C 23/005* (2013.01); *G06F 3/0238* (2013.01);
(Continued)

(58) Field of Classification Search
CPC .. G06F 3/0219; G06F 3/04897; G06F 3/0238; G06F 1/30; G08G 5/0021; G08G 5/0013; G10L 25/51
(Continued)

(56) References Cited

U.S. PATENT DOCUMENTS

| | | | | |
|---|---|---|---|---|
| 5,517,561 | A | * | 5/1996 | Redden ............. H04M 1/72519 |
| | | | | 379/142.01 |
| 5,809,402 | A | * | 9/1998 | Lemme .............. H04B 7/18506 |
| | | | | 455/73 |

(Continued)

*Primary Examiner* — Fred Tzeng
(74) *Attorney, Agent, or Firm* — Davis Wright Tremaine LLP; Heather M. Colburn; George C. Rondeau, Jr.

(57) ABSTRACT

A user interface for an avionics interface device. The interface includes a display, selectable keys, and three annunciations. The keys include alphanumeric, functional, and line select keys. The functional keys are positioned above the display. The alphanumeric keys are positioned below the display. First and second portions of the line select keys are positioned along left and right side portions, respectively, of the display. All of the functional keys are separate and spaced apart from all of the alphanumeric keys. Pressing a line select key selects a line of the display that is positioned next to and aligned with the line select key. The annunciations identify a state of the avionics interface device. First and second annunciations indicate the device is configured to communicate with a Controller-Pilot Data Link Communications system and an Aircraft Communications Addressing and Reporting System, respectively. A third annunciation indicates the device has encountered a failure.

20 Claims, 5 Drawing Sheets

(51) Int. Cl.
*G08G 5/00* (2006.01)
*G06F 3/023* (2006.01)
*G01C 23/00* (2006.01)

(52) U.S. Cl.
CPC ....... *G06F 3/04897* (2013.01); *G08G 5/0013* (2013.01); *G08G 5/0021* (2013.01)

(58) Field of Classification Search
USPC ........................................................ 345/172
See application file for complete search history.

(56) References Cited

U.S. PATENT DOCUMENTS

| | | | | | |
|---|---|---|---|---|---|
| 5,920,807 | A * | 7/1999 | Lemme | .................... | H04B 1/40 340/945 |
| 6,175,314 | B1 * | 1/2001 | Cobley | ................ | G08G 5/0013 340/945 |
| 6,862,651 | B2 * | 3/2005 | Beckert | ..................... | G06F 1/30 711/103 |
| 7,440,906 | B1 * | 10/2008 | Wetzer | ................ | G06Q 10/0631 705/7.12 |
| 9,014,641 | B2 * | 4/2015 | Tamura | ............... | H04W 76/048 455/67.11 |
| 9,924,003 | B2 * | 3/2018 | Jun | ..................... | H04M 1/0249 |
| 2002/0028662 | A1 * | 3/2002 | Yoshinaga | ........... | H04B 1/3833 455/575.3 |
| 2003/0093187 | A1 * | 5/2003 | Walker | .................... | B64C 13/20 701/1 |
| 2004/0059497 | A1 * | 3/2004 | Sankrithi | ................ | B64C 25/50 701/120 |
| 2005/0156777 | A1 * | 7/2005 | King | ....................... | G01S 3/023 342/29 |
| 2005/0232167 | A1 * | 10/2005 | Gilbert | ............. | H04L 29/06027 370/260 |
| 2007/0288242 | A1 * | 12/2007 | Spengler | ................. | G10L 15/20 704/275 |
| 2011/0035080 | A1 * | 2/2011 | Murphy | ................. | B64D 45/04 701/9 |
| 2011/0106345 | A1 * | 5/2011 | Takacs | ................. | G05D 1/0676 701/17 |
| 2011/0241896 | A1 * | 10/2011 | Camino | ................... | G08B 3/10 340/691.5 |
| 2013/0204487 | A1 * | 8/2013 | Ovens | ....................... | B64F 5/00 701/33.2 |
| 2015/0161896 | A1 * | 6/2015 | Judy | ..................... | G01C 23/00 340/901 |
| 2015/0251771 | A1 * | 9/2015 | Whitlow | ............... | B64D 45/00 701/3 |
| 2016/0362093 | A1 * | 12/2016 | Gadzinski | ............ | B60T 8/1703 |
| 2017/0039858 | A1 * | 2/2017 | Wang | ..................... | G10L 25/51 |

\* cited by examiner

AIRCRAFT AVIONICS DATA INPUT PANEL

CROSS REFERENCE TO RELATED APPLICATION(S)

This application claims the benefit of U.S. Provisional Application No. 62/281,501, filed on Jan. 21, 2016, which is incorporated herein by reference in its entirety.

BACKGROUND OF THE INVENTION

Field of the Invention

The present invention is directed generally to aircraft avionics data input panels.

Description of the Related Art

Various designs exist for the layout of keys in a functional arrangement for aircraft avionics data input for systems such as but not limited to Aircraft Communications Addressing and Reporting System ("ACARS"), Controller-Pilot Data Link Communications ("CPDLC") system, Aeronautical Telecommunications Network ("ATN"), and Future Air Navigation Systems ("FANS"). It is desirable to increase the functionality of the key layouts used for aircraft avionics data input for various systems. The present application provides this and other advantages as will be apparent from the following detailed description and accompanying figures.

SUMMARY

The present application describes an interface device configured to interface with one or more aircraft avionics data systems. The interface device includes a display, a faceplate, a plurality of selectable keys, and first, second, and third annunciations. The display is positioned in a display area of the faceplate. The faceplate has a top portion opposite a bottom portion, and a left side portion opposite a right side portion. The plurality of selectable keys are positioned by the faceplate in a functional arrangement around the display. The plurality of selectable keys include alphanumeric keys, functional keys, and line select keys. The functional and alphanumeric keys are positioned along the top and bottom portions, respectively, of the faceplate. First and second portions of the line select keys are positioned along the left and right side portions, respectively, of the faceplate. All of the functional keys are separate and spaced apart from all of the alphanumeric keys. Pressing one of the line select keys selects a line of the display. The line is positioned next to the pressed line select key. The first, second, and third annunciations are positioned by the faceplate and identify a state of the interface device. The first annunciation indicates the interface device is configured to communicate with a Controller-Pilot Data Link Communications system. The second annunciation indicates the interface device is configured to communicate with an Aircraft Communications Addressing and Reporting System. The third annunciation indicates the interface device has encountered a failure.

The alphanumeric keys may include the following:
number keys each representing a different numerical value from 0-9;
letter keys each representing a different letter from A-Z;
a first key representing a period or decimal point;
a second key representing positive or negative;
a third key representing a delete function;
a fourth key representing a forward slash character;
a fifth key representing a clear function; and
a sixth key representing a space.

For example, the alphanumeric keys may include only the above keys. The number keys may be arranged in a first linear row, and the letter keys may be arranged in second, third, and fourth linear rows. The letter keys representing the letters V and B may be in the fourth linear row. The sixth key representing the space may be positioned between the letter keys representing the letters V and B. The first and second keys may be in the first linear row after the number keys, the third key may be in the third linear row after those of the letter keys in the third linear row, and the fourth and fifth keys may be in the fourth linear row after those of the letter keys in the fourth linear row.

The first portion of the line select keys may include six vertically aligned keys, and the second portion of the line select keys may include six different vertically aligned keys.

The functional keys may be arranged in a linear row with more frequently used ones of the functional keys being closer to ends of the linear row than less frequently used ones of the functional keys.

Each of a portion of the functional keys may identify a different corresponding aircraft avionics data system, and selecting one of the portion of functional keys may configure the interface device to communicate with the corresponding aircraft avionics data system and cause the interface device to display a menu with information associated with the corresponding aircraft avionics data system on the display. The portion of the functional keys may include a first functional key corresponding to the Controller-Pilot Data Link Communications system, and a second functional key corresponding to the Aircraft Communications Addressing and Reporting System. The portion of the functional keys may include a first functional key corresponding to the Controller-Pilot Data Link Communications system, a second functional key corresponding to the Aircraft Communications Addressing and Reporting System, a third functional key corresponding to an Aeronautical Telecommunications Network, and a fourth functional key corresponding to Future Air Navigation Systems.

The interface device may be configured to interface with a plurality of aircraft avionics data systems. Selecting a particular one of the functional keys may cause the interface device to display a top-level menu, and the top-level menu may display options for selecting a particular one of the plurality of aircraft avionics data systems with which to communicate.

The first, second, and third annunciations may be vertically aligned with one another in a linear column and positioned on the left side portion of the faceplate.

The present application describes a user interface for an avionics interface device. The user interface includes a display, a plurality of selectable keys, and first, second, and third annunciations. The display has a top portion opposite a bottom portion and a left side portion opposite a right side portion. The plurality of selectable keys are arranged around the display. The plurality of selectable keys include alphanumeric keys, functional keys, and line select keys. The functional keys are spaced apart from and positioned above the top portion of the display. The alphanumeric keys are spaced apart from and positioned below the bottom portion of the display. First and second portions of the line select keys are positioned along the left and right side portions, respectively, of the display. All of the functional keys are separate and spaced apart from all of the alphanumeric keys. Pressing one of the line select keys selects a line of the display. The line being positioned next to and aligned with the pressed line select key. The first, second, and third annunciations are positioned alongside the display and identify a state of the avionics interface device. The first annunciation indicates the avionics interface device is configured to communicate with a Controller-Pilot Data Link Communications system. The second annunciation indicates the avionics interface device is configured to communicate with an Aircraft Communications Addressing and Reporting System. The third annunciation indicates the avionics interface device has encountered a failure.

The alphanumeric keys may include only the following:
number keys each representing a different numerical value from 0-9;
letter keys each representing a different letter from A-Z;
a first key representing a period or decimal point;
a second key representing positive or negative;
a third key representing a delete function;
a fourth key representing a forward slash character;
a fifth key representing a clear function; and
a sixth key representing a space.

The number keys may be arranged in a first linear row, and the letter keys may be arranged in second, third, and fourth linear rows. The letter keys representing the letters V and B may be in the fourth linear row, and the sixth key representing the space may be positioned between the letter keys representing the letters V and B. The first and second keys may be in the first linear row after the number keys, the third key is in the third linear row after those of the letter keys in the third linear row, and the fourth and fifth keys are in the fourth linear row after those of the letter keys in the fourth linear row.

The functional keys may be arranged in a linear row with more frequently used ones of the functional keys being closer to ends of the linear row than less frequently used ones of the functional keys.

Each of a portion of the functional keys may identify a different corresponding aircraft avionics data system, and selecting one of the portion of functional keys may instruct the avionics interface device to communicate with the corresponding aircraft avionics data system and cause the avionics interface device to display a menu with information associated with the corresponding aircraft avionics data system on the display. The portion of the functional keys may include a first functional key corresponding to the Controller-Pilot Data Link Communications system, and a second functional key corresponding to the Aircraft Communications Addressing and Reporting System.

The first, second, and third annunciations may be vertically aligned with one another in a linear column and positioned along the left side portion of the display outwardly from the first portion of the line select keys.

BRIEF DESCRIPTION OF THE SEVERAL VIEWS OF THE DRAWING(S)

Exemplary embodiments are illustrated in referenced figures. It is intended that the embodiments and figures disclosed herein are considered illustrative rather than restrictive.

Like reference numerals have been used in the figures to identify like components.

DETAILED DESCRIPTION OF THE INVENTION

Figure 1:
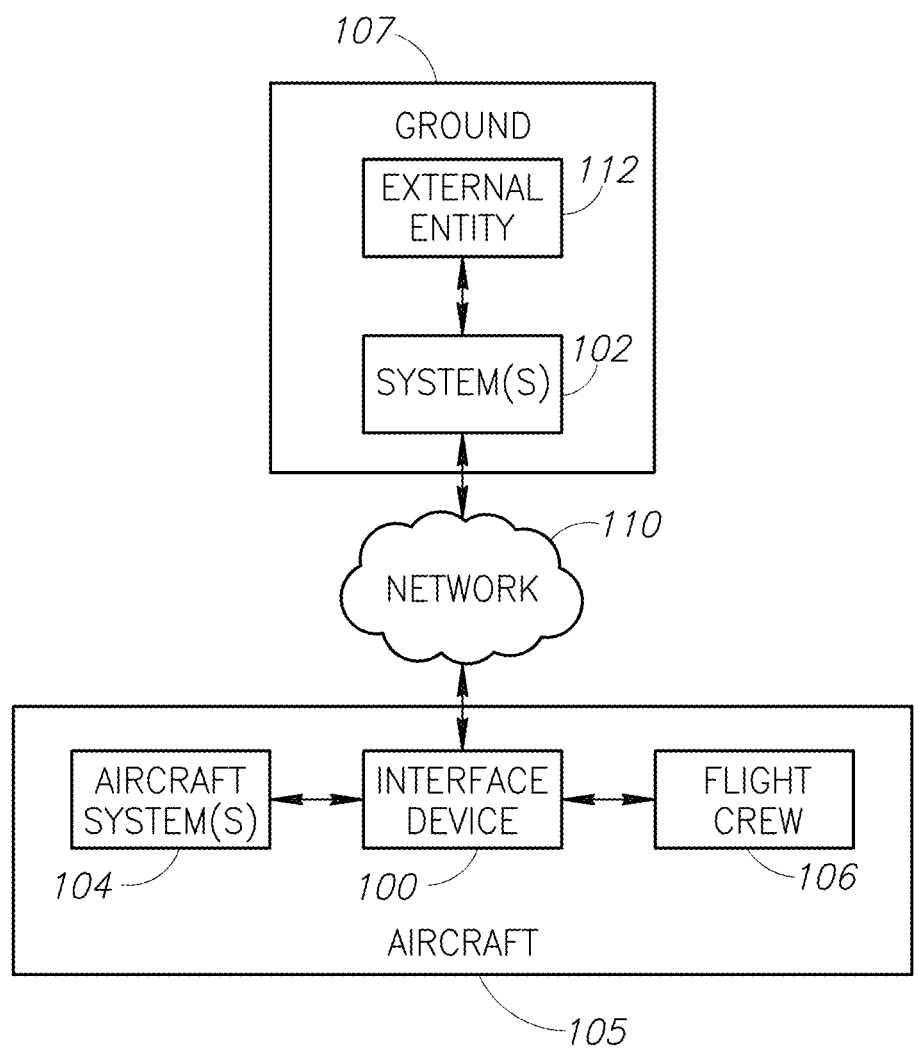
FIG. 1 is a block diagram of an avionics communication system including an interface device having functionally arranged keys.

FIG. 1 illustrates an avionics interface device 100 configured to interface with one or more aircraft avionics data systems 102 and 104. The interface device 100 may be located on an aircraft 105. The system(s) 102 and 104 may be located on the aircraft 105 and/or on the ground 107. In the embodiment illustrated, the system(s) 102 is/are located on the ground 107 and the system(s) 104 are located on the aircraft 105. By way of non-limiting examples, the system(s) 102 may include one or more of the following systems:
Aircraft Communications Addressing and Reporting System ("ACARS");
Controller-Pilot Data Link Communications ("CPDLC") system, which is also known as ATC Data Link ("ATC") system;
Aeronautical Telecommunications Network ("ATN"); and
Future Air Navigation Systems ("FANS").

A flight crew 106 may use the interface device 100 to send messages to and/or receive messages from the system(s) 102 over a network 110. By way of a non-limiting example, the network 110 may include one or more of a Very-High Frequency Digital Link ("VDL") Mode A network, a VDL Mode 2 network, a SATCOM network, and the like. The system(s) 102 may provide communication between the flight crew 106 and an external entity 112 (e.g., an air traffic controller, one or more air traffic service units, and the like).

The interface device 100 may operate in one or more different modes. For example, the interface device 100 may operate in a first mode (referred to as a "FANS 1/A CPDLC and ADS-C mode"), in which the network 110 may be implemented using the SATCOM network and the system(s) 102 may be implemented as the CPDLC system or Automatic dependent surveillance-contract ("ADS-C") system. The CPDLC system enables two-way data link communication between the flight crew 106 and the external entity 112 (e.g., the air traffic controller). The ADS-C system supports sending flight information from the aircraft 105 to specific ground Air Traffic Service Units ("ATSUs").

The interface device 100 may operate in a second mode (referred to as an "ATN CPDLC mode"), in which the system(s) 102 may be implemented as the CPDLC system and the network 110 may be implemented as VDL Mode 2.

The interface device 100 may operate in a third mode (referred to as an "ACARS" mode), in which the system(s) 102 may be implemented as ACARS and the network 110 is implemented as VDL Mode A, VDL Mode 2 (AOA), and/or SATCOM.

The interface device 100 may be configured to work with an assortment of aircraft end system devices or aircraft systems (e.g., the system(s) 104), including a Flight Management Computer ("FMC"), and forward requests such as Winds Aloft or Flight Plan updates. These requests are transparently sent through the interface device 100 to the ground 107 when initiated from the FMC. The accompanying response messages from the ground 107 are routed by the interface device 100 back to the FMC (where the uplinked message and data is available).

Figure 2:
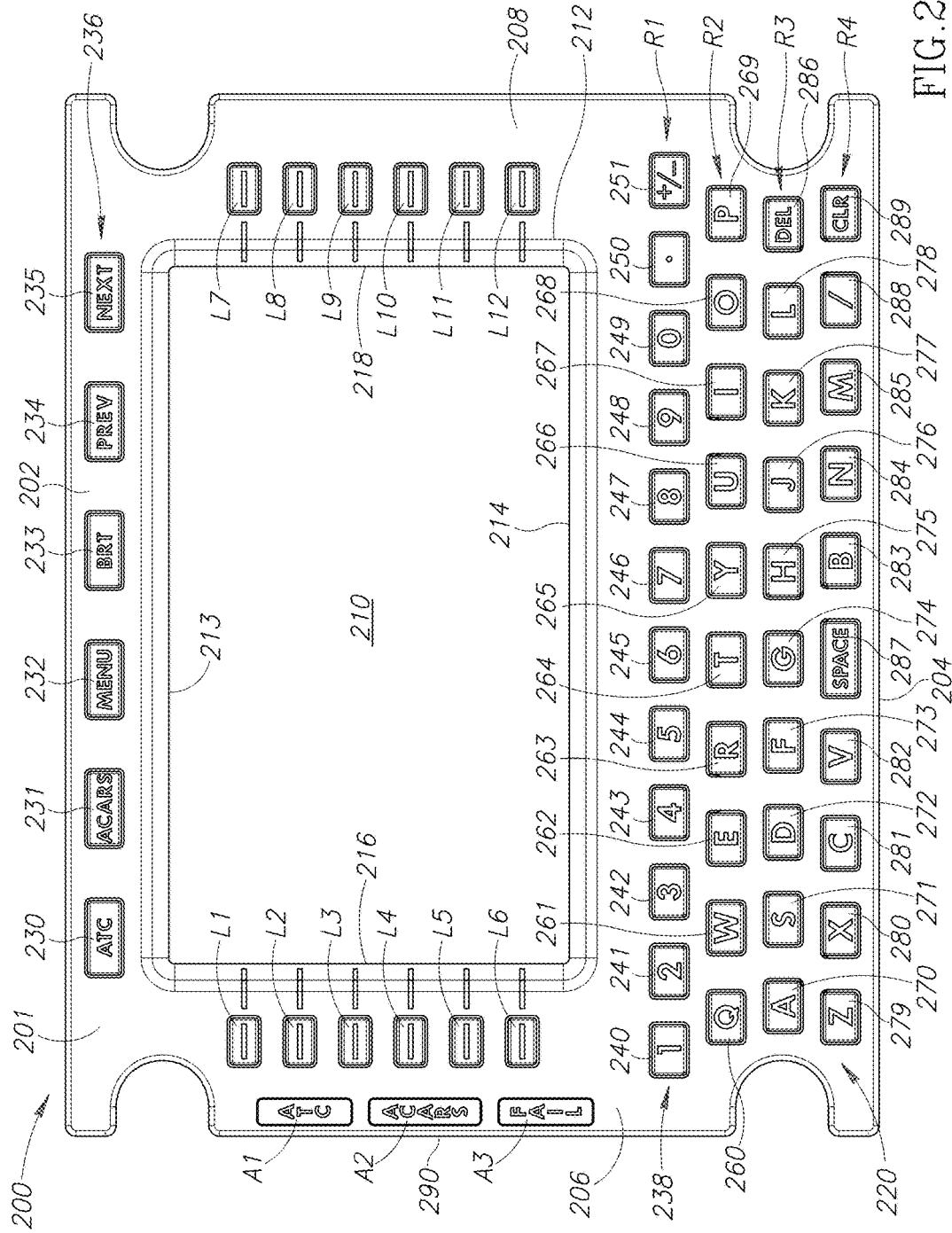
FIG. 2 is a front view of a faceplate, which surrounds a display and positions the keys of the interface device.

FIG. 2 illustrates a user interface 200 for inputting information into and/or receiving information from the interface device 100 (see FIG. 1). The user interface 200 illustrated includes a faceplate 201 that is generally rectangular in shape and has a top portion 202 opposite a bottom portion 204 and a left side portion 206 opposite a right side portion 208. In the embodiment illustrated, the faceplate 201 is about 4.44 inches tall and about 5.69 inches long. However, this is not a requirement.

The user interface 200 includes a display 210. The faceplate 201 is configured to at least partially surround a display 210, which is located at or near a center portion or display area 212 of the faceplate 201. Like the faceplate 201, the display 210 has a top portion 213 opposite a bottom portion 214 and a left side portion 216 opposite a right side portion 218. Information is displayed to the flight crew 106 (see FIG. 1) by the display 210. When the flight crew 106 (see FIG. 1) inputs information into the interface device 100 (see FIG. 1), the display 210 may be used to display that information in an input screen (referred to as a "Scratchpad"). The display 210 may be implemented as a conventional display device, such as a compact Control Display Unit ("CDU"), a liquid crystal display, and the like. For example, the display 210 may be implemented as a compact CDU that displays the information in dual colors and six lines. The CDU may be implemented as a sunlight readable +/−60° vertical and +/−70° horizontal viewable display.

The user interface 200 includes a unique and improved set of input keys 220 positioned by the faceplate 201. The input keys 220 are arranged in a unique layout that may be characterized as being a functional arrangement for providing aircraft avionics data input to one or more of the system(s) 102 and 104 (see FIG. 1).

Two or more of the input keys 220 may be combined (or repurposed) for multifunctional use. This allows the interface device 100 to serve as an interface to (or an array of) multiple known and intended systems, such as ACARS, CPDLC, ATN, FANS, and the like. The interface device 100 is easily adaptable for use with new systems.

The input keys 220 include hard buttons or function keys 230-235 positioned at or near the top portion 202 of the faceplate 201. The function keys 230-235 are apart from and positioned above the top portion 213 of the display 210. The (ATC) function key 230 may place the interface device 100 (see FIG. 1) in the first or second mode of operation. The (ATC) function key 230 provides access to Air Traffic Services ("ATS") messages as well as to CPDLC system functions. Selecting the (ATC) function key 230 allows access to an ATC Menu (not shown) through which the interface device 100 communicates with the CPDLC (or ATC) system. The ATC menu (not shown) allows the flight crew 106 to compose downlinks to the ATC system, send reports to the ATC system, send ATS messages (e.g., Oceanic Clearance Requests), and access a log of ATC messages. When a new uplink message is received from the ATC system, the flight crew 106 may view it immediately by selecting the (ATC) function key 230.

The (ACARS) function key 231 allows access to an AOC (Company) menu (not shown). The (ACARS) function key 231 may place the interface device 100 (see FIG. 1) in the third mode of operation. The flight crew 106 may use this selection and menus displayed by the display 210 to view and/or print a Load Sheet, send a Weather Request or Diversion Report, and to use other Company Defined messages. Thus, the function keys 230 and 231 may instruct the interface device 100 (see FIG. 1) to communicate with corresponding external aircraft avionics data systems, namely, the CPDLC system and ACARS, respectively.

The (MENU) function key 232 allows access to a top-level menu 300 (see FIG. 3), which provides quick access to the ATC Menu (not shown), and other systems (such as SATCOM) that can be controlled via the interface device 100.

The (BRT) function key 233 in conjunction with a key 251 (labeled "+/−" in FIG. 2) allows the flight crew 106 (see FIG. 1) to increase or decrease brightness of the display 210 manually.

The (PREV) function key 234 allows the flight crew 106 (see FIG. 1) to page back through menus displayed by the display 210 that include multiple pages or sub-menus (such as a LOGON/STATUS page). Similarly, the (NEXT) function key 235 allows the flight crew 106 (see FIG. 1) to page forward through such menus.

The function keys 230-235 may be arranged in a linear row 236. This unique arrangement sorts the function keys 230-235 from the outside to inside in a most used and easiest to locate order. In other words, the two most frequently used function keys 230 and 235 are positioned nearest to ends of the row 236 (e.g., nearest the side portions 206 and 208) and the two least frequently used function keys 232 and 233 are positioned farthest from the ends of the row 236 (e.g., farthest from the side portions 206 and 208). A natural chronological order of function keys 234 and 235 (representing previous and next, respectively) is provided for ease of use.

Annunciations A1-A3 are provided down the left side portion 206 of the faceplate 201. The annunciations A1-A3 are positioned by the faceplate 201 and may be vertically aligned with one another in a linear column. The annunciations A1-A3 are configured to indicate a state of the interface device 100 (see FIG. 1). By way of an example, the annunciations A1-A3 may light up to identify a current state of the interface device 100 (see FIG. 1). For example, the annunciation A1 (labeled "ATC") may light up when the interface device 100 (see FIG. 1) is configured to communicate with the CPDLC (or ATC) system. The annunciation A2 (labeled "ACARS") may light up when the interface device 100 (see FIG. 1) is configured to communicate with ACARS. The annunciation A3 (labeled "FAIL") may light up when the interface device 100 (see FIG. 1) encounters a failure.

The input keys 220 also include alphanumeric keys 238 positioned at or near the bottom portion 204. The alphanumeric keys 238 are apart from and positioned below the bottom portion 214 of the display 210. The intuitive arrangement of the function keys 230-235 at the top portion 202 of the faceplate 201 isolates these commonly used inputs from the alphanumeric keys 238, which improves user response time.

The alphanumeric keys 238 include number keys 240-249 and letter keys 260-285. In the example illustrated, the number keys 240-249 are arranged in a first linear row R1 and the letter keys 260-285 are arranged in second, third, and fourth linear rows R2-R4 positioned under the first row R1. In the first row R1, the number keys 240-249 and keys 250 and 251 are arranged left to right. The number keys 240-249 represent digits 1, 2, 3, 4, 5, 6, 7, 8, 9, and 0, respectively. The key 250 represents a period or a decimal point (labeled "." in FIG. 2). The key 251 represents positive or negative (labeled "+/−" in FIG. 2).

In the second row R2, the letter keys 260-269 are arranged left to right and represent letters Q, W, E, R, T, Y, U, I, O, and P, respectively. In the third row R3, the letter keys 270-278 and a key 268 are arranged left to right. The letter keys 270-278 represent letters A, S, D, F, G, H, J, K, and L, respectively. The last key 286 in the third row R3 represents or implements a delete function (labeled "DEL" in FIG. 2). The (DEL) key 286 is used to delete an entry (in an entry location) from the display 210.

In the fourth row R4, the letter keys 279-282, a key 287, the letter keys 283-285, and keys 288 and 289 are arranged left to right. The letter keys 279-285 represent letters Z, X, C, V, B, N, and M, respectively. The key 287 represents or implements a space function (labeled "SPACE" in FIG. 2). The key 287 is positioned between the letter keys 282 and 283 representing letters V and B, respectively. Also, in the fourth row R4, the key 288 represents or implements a forward slash (labeled "I" in FIG. 2) and the last key 289 represents or implements a clear function (labeled "CLR" in FIG. 2). Pressing the (CLR) key 289 clears the display 210 of any values entered into entry locations of the display 210. Thus, the (CLR) key 289 may be used to clear the contents of the Scratchpad.

In the embodiment illustrated, the alphanumeric keys 238 include only the most commonly used alphanumeric and symbolic keys (which correspond to the keys 240-289), which improves input time by illuminating clutter and user search time for specific keys. This unique arrangement places the keys 250, 251, 286, 288, and 289 representing special symbols at the outer right hand side for quick location, while keeping the (SPACE) key 287 in a more natural centered home location.

In the embodiment illustrated, the alphanumeric keys 238 implement at least a portion of a standard QWERTY keyboard. However, as is apparent to those of ordinary skill in the art, the alphanumeric keys 238 may be modified to represent numbers and letters of different alphabets and languages. Further, the alphanumeric keys 238 may be arranged differently (e.g., placed in different rows, placed in a different number of rows, and/or ordered differently within the rows).

Data may be entered into the interface device 100 (see FIG. 1) using the alphanumeric keys 238 (and viewed on the Scratchpad or an input screen) and/or by selecting one or more line select keys ("LSKs") L1-L12 positioned alongside the display 210. The LSKs L1-L6 are used to select lines displayed along the left side portion 216 of the display 210 and the LSKs L7-L12 are used to select lines displayed along the right side portion 218 of the display 210. The (left) LSKs L1-L6 are vertically aligned and positioned along the left side portion 216 of the display 210. On the other hand, the (right) LSKs L7-L12 are vertically aligned and positioned along the right side portion 218 of the display 210. In the embodiment illustrated, the annunciations A1-A3 are located along the left side portion 206 of the faceplate 201 between the LSKs L1-L6 and a peripheral edge 290 of the faceplate 201.

Figure 5:
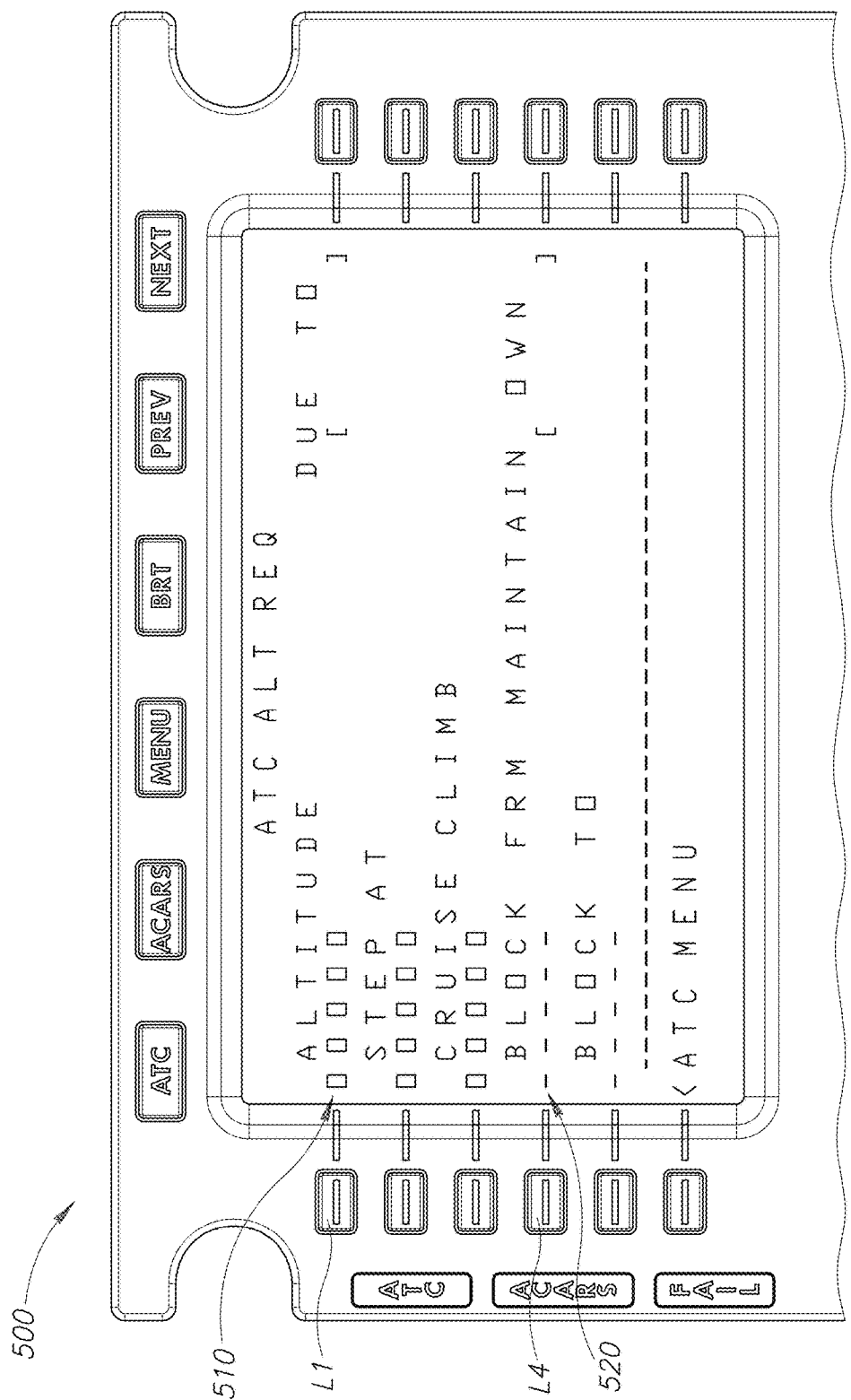
FIG. 5 is a front view of the faceplate, the keys, and the display displaying a data input screen.

FIG. 5 depicts a data input screen 500, in which boxes 510 identify entry locations for mandatory data, and dashes 520 identify entry locations for optional data. In FIG. 5, the boxes 510 are positioned next to and aligned with the LSK L1. The boxes 510 appear under a label "ALTITUDE." Data (e.g., the current altitude of aircraft 105 illustrated in FIG. 1) may be entered into the boxes 510 by selecting the LSK L1 and using the alphanumeric keys 238 to enter information. Optionally, data may be entered into the dashes 520 by selecting the LSK L4 (which is aligned with the dashes 520) and using the alphanumeric keys 238 to enter information. The option to SEND a message may be unavailable until after all of the mandatory data has been entered.

The LSKs L1-L12 may be used to implement menu navigation shortcuts. For example, referring to FIG. 3, the top-level menu 300 (displayed by the display 210) lists three options "ATC," "ACARS," and "MAINT" next to and aligned with LSKs L2, L8, and L12, respectively. The flight crew 106 (see FIG. 1) may select one of the LSKs L2, L8, and L12 to select the corresponding option. For example, when the LSK L2 is selected, the option "ATC" is selected and the display 210 displays the ATC menu (not shown). The (ATC) function key 230 and the LSK L2 both provide access to the ATC menu (not shown), which may be used to access ATS messages as well as CPDLC functions.

Figure 3:
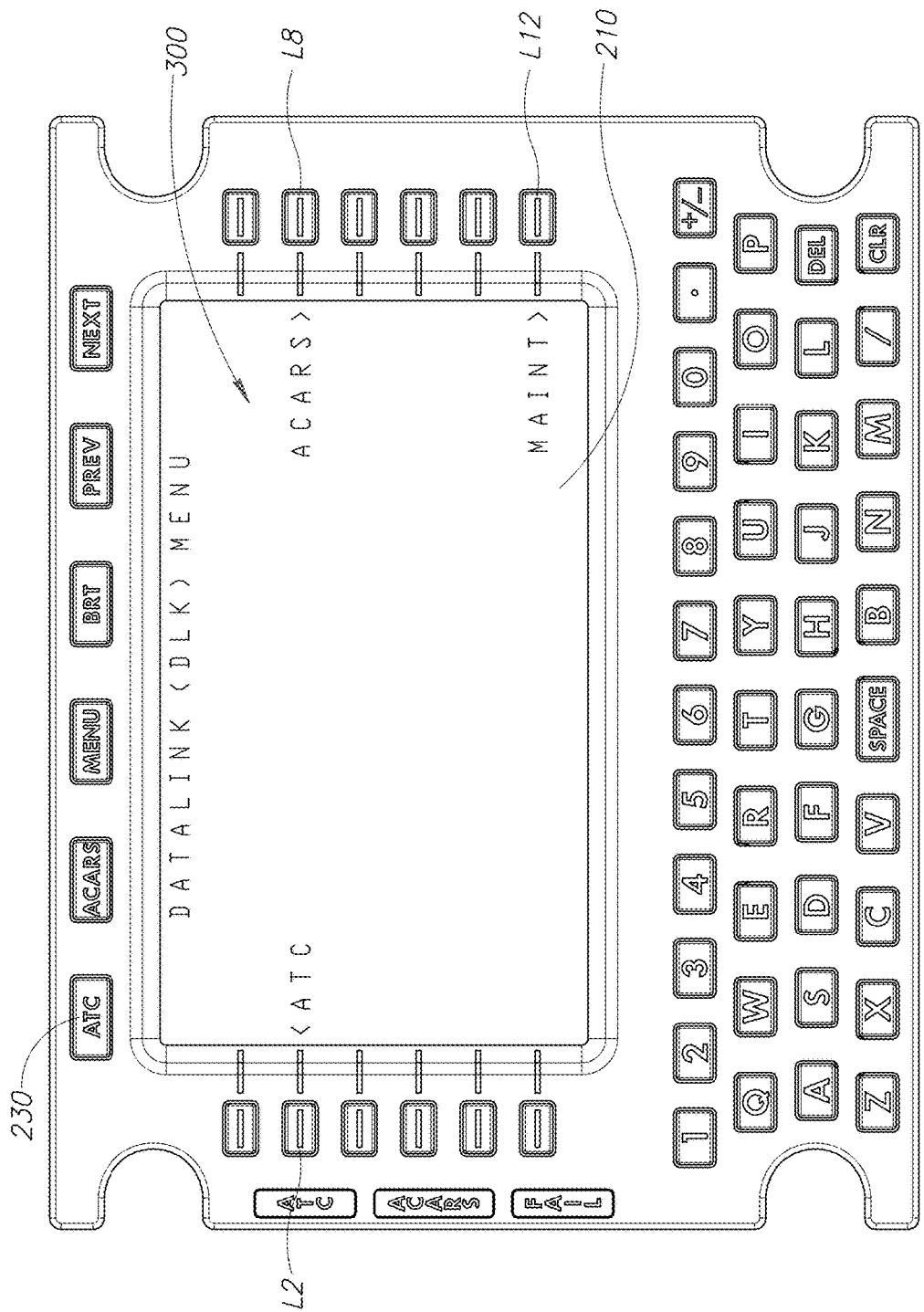
FIG. 3 is a front view of the faceplate, the keys, and the display displaying a top-level menu.
Figure 4:
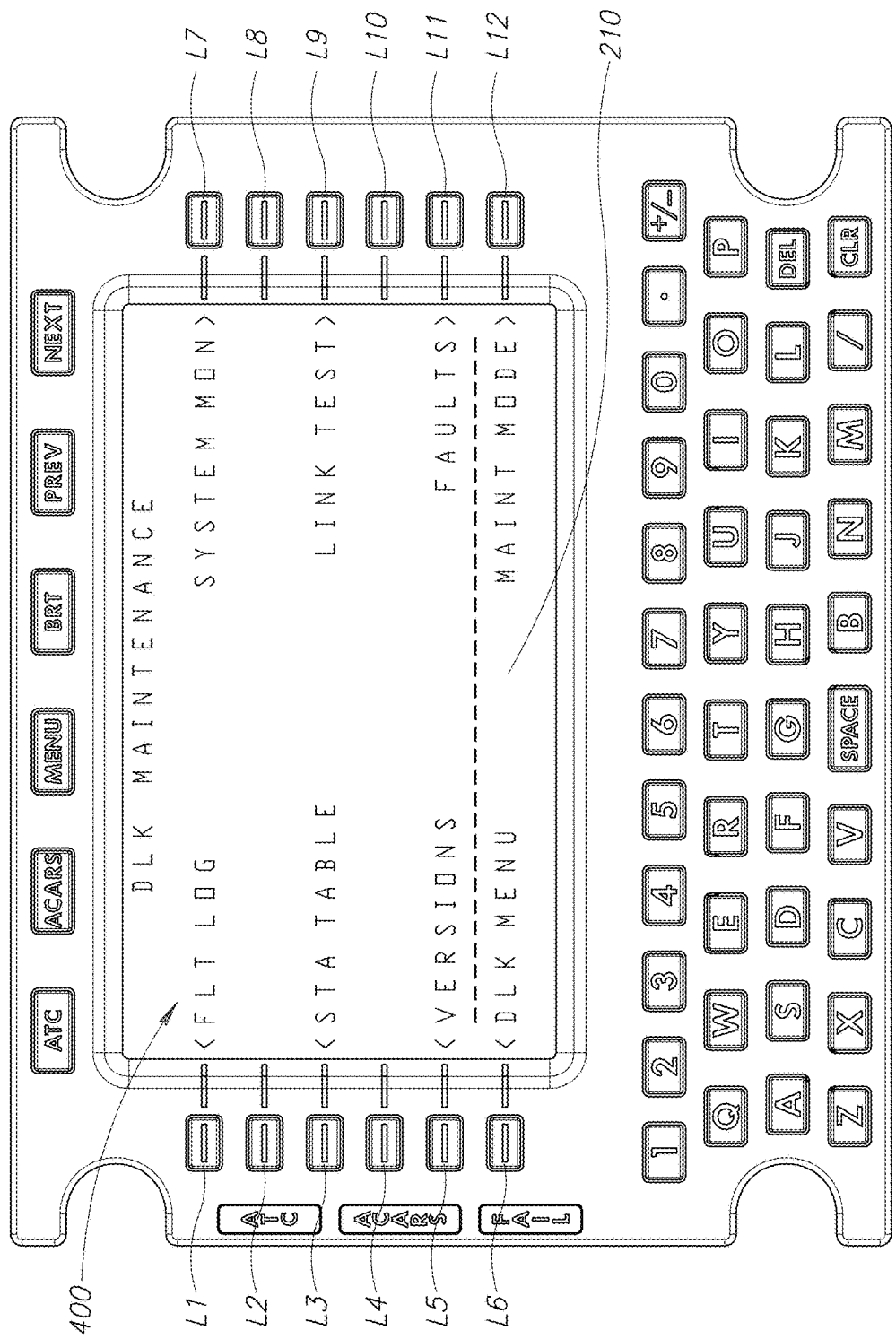
FIG. 4 is a front view of the faceplate, the keys, and the display displaying a maintenance page.

FIG. 4 depicts the display 210 after the flight crew 106 (see FIG. 1) has selected and pressed the LSK 12 in FIG. 3, which corresponds to the "MAINT" function. Referring to FIG. 4, the display 210 shows a maintenance screen or page 400 with the selectable options listed in Table A below.

TABLE A

| LSK | Option | Short Description of Corresponding Function |
| --- | --- | --- |
| L1 | FLT LOG | Current flight Out-Off-On-In times, fuel, flight number and date for in addition to previous three flights. |
| L3 | STA TABLE | Current VHF ground station connectivity and VHF Mode |
| L5 | VERSIONS | View of system configuration part numbers and versions including personality module configuration for customer's installation. |
| L7 | SYSTEM MON | Current OOOI state, tuned frequency, and other status information |
| L9 | LINK TEST | Test ACARS or AVLC connectivity |
| L11 | FAULTS | Current fault list (if any) |
| L6 | DLK MENU | Menu navigation back to main menu |
| L12 | MAINT MODE | Password protected maintenance functions only available when aircraft is on ground. |

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An interface device configured to interface with one or more aircraft avionics data systems, the interface device comprising:
   a display;
   a faceplate having a top portion opposite a bottom portion, and a left side portion opposite a right side portion, the display positioned in a display area of the faceplate;
   a plurality of selectable keys positioned by the faceplate in a functional arrangement around the display, the plurality of selectable keys comprising alphanumeric keys, functional keys, and line select keys, the functional keys being positioned along the top portion of the faceplate, the alphanumeric keys being positioned along the bottom portion of the faceplate, a first portion of the line select keys being positioned along the left side portion of the faceplate, and a second portion of the line select keys being positioned along the right side portion of the faceplate, all of the functional keys being separate and spaced apart from all of the alphanumeric keys, pressing one of the line select keys selecting a line of the display, the line being positioned next to the pressed line select key; and
   first, second, and third annunciations positioned by the faceplate and identifying a state of the interface device, the first annunciation indicating the interface device is configured to communicate with a Controller-Pilot Data Link Communications system, the second annunciation indicating the interface device is configured to communicate with an Aircraft Communications Addressing and Reporting System, and the third annunciation indicating the interface device has encountered a failure.

2. The interface device of claim 1, wherein the alphanumeric keys include only:
   number keys each representing a different numerical value from 0-9;
   letter keys each representing a different letter from A-Z;
   a first key representing a period or decimal point;
   a second key representing positive or negative;
   a third key representing a delete function;
   a fourth key representing a forward slash character;
   a fifth key representing a clear function; and
   a sixth key representing a space.

3. The interface device of claim 1, wherein the alphanumeric keys comprise:
   number keys each representing a different numerical value from 0-9;
   letter keys each representing a different letter from A-Z;
   a first key representing a period or decimal point;
   a second key representing positive or negative;
   a third key representing a delete function;
   a fourth key representing a forward slash character;
   a fifth key representing a clear function; and
   a sixth key representing a space.

4. The interface device of claim 3, wherein the number keys are arranged in a first linear row;
   the letter keys are arranged in second, third, and fourth linear rows;
   the letter keys representing the letters V and B are in the fourth linear row; and
   the sixth key representing the space is positioned between the letter keys representing the letters V and B.

5. The interface device of claim 4, wherein the first and second keys are in the first linear row after the number keys,
   the third key is in the third linear row after those of the letter keys in the third linear row, and
   the fourth and fifth keys are in the fourth linear row after those of the letter keys in the fourth linear row.

6. The interface device of claim 1, wherein the first portion of the line select keys comprises six vertically aligned keys, and
   the second portion of the line select keys comprises six different vertically aligned keys.

7. The interface device of claim 1, wherein the functional keys are arranged in a linear row with more frequently used ones of the functional keys being closer to ends of the linear row than less frequently used ones of the functional keys.

8. The interface device of claim 1, wherein each of a portion of the functional keys identifies a different corresponding aircraft avionics data system, and
   selecting one of the portion of functional keys configures the interface device to communicate with the corresponding aircraft avionics data system and causes the interface device to display a menu with information associated with the corresponding aircraft avionics data system on the display.

9. The interface device of claim 8, wherein the portion of the functional keys comprises a first functional key corresponding to the Controller-Pilot Data Link Communications system, and a second functional key corresponding to the Aircraft Communications Addressing and Reporting System.

10. The interface device of claim 8, wherein the portion of the functional keys comprises:
    a first functional key corresponding to the Controller-Pilot Data Link Communications system,
    a second functional key corresponding to the Aircraft Communications Addressing and Reporting System,
    a third functional key corresponding to an Aeronautical Telecommunications Network, and
    a fourth functional key corresponding to Future Air Navigation Systems.

11. The interface device of claim 1 configured to interface with a plurality of aircraft avionics data systems, wherein selecting a particular one of the functional keys causes the interface device to display a top-level menu, and the top-level menu displays options for selecting a particular one of the plurality of aircraft avionics data systems with which to communicate.

12. The interface device of claim 1, wherein the first, second, and third annunciations are vertically aligned with one another in a linear column and positioned on the left side portion of the faceplate.

13. A user interface for an avionics interface device, the user interface comprising:
  a display having a top portion opposite a bottom portion and a left side portion opposite a right side portion;
  a plurality of selectable keys arranged around the display, the plurality of selectable keys comprising alphanumeric keys, functional keys, and line select keys, the functional keys being spaced apart from and positioned above the top portion of the display, the alphanumeric keys being spaced apart from and positioned below the bottom portion of the display, a first portion of the line select keys being positioned along the left side portion of the display, and a second portion of the line select keys being positioned along the right side portion of the display, all of the functional keys being separate and spaced apart from all of the alphanumeric keys, pressing one of the line select keys selecting a line of the display, the line being positioned next to and aligned with the pressed line select key; and
  first, second, and third annunciations positioned alongside the display and identifying a state of the avionics interface device, the first annunciation indicating the avionics interface device is configured to communicate with a Controller-Pilot Data Link Communications system, the second annunciation indicating the avionics interface device is configured to communicate with an Aircraft Communications Addressing and Reporting System, and the third annunciation indicating the avionics interface device has encountered a failure.

14. The user interface of claim 13, wherein the alphanumeric keys include only:
  number keys each representing a different numerical value from 0-9;
  letter keys each representing a different letter from A-Z;
  a first key representing a period or decimal point;
  a second key representing positive or negative;
  a third key representing a delete function;
  a fourth key representing a forward slash character;
  a fifth key representing a clear function; and
  a sixth key representing a space.

15. The user interface of claim 14, wherein the number keys are arranged in a first linear row;
  the letter keys are arranged in second, third, and fourth linear rows;
  the letter keys representing the letters V and B are in the fourth linear row; and
  the sixth key representing the space is positioned between the letter keys representing the letters V and B.

16. The user interface of claim 15, wherein the first and second keys are in the first linear row after the number keys,
  the third key is in the third linear row after those of the letter keys in the third linear row, and
  the fourth and fifth keys are in the fourth linear row after those of the letter keys in the fourth linear row.

17. The user interface of claim 13, wherein the functional keys are arranged in a linear row with more frequently used ones of the functional keys being closer to ends of the linear row than less frequently used ones of the functional keys.

18. The user interface of claim 13, wherein each of a portion of the functional keys identifies a different corresponding aircraft avionics data system, and
  selecting one of the portion of functional keys instructs the avionics interface device to communicate with the corresponding aircraft avionics data system and causes the avionics interface device to display a menu with information associated with the corresponding aircraft avionics data system on the display.

19. The user interface of claim 18, wherein the portion of the functional keys comprises a first functional key corresponding to the Controller-Pilot Data Link Communications system, and a second functional key corresponding to the Aircraft Communications Addressing and Reporting System.

20. The user interface of claim 13, wherein the first, second, and third annunciations are vertically aligned with one another in a linear column and positioned along the left side portion of the display outwardly from the first portion of the line select keys.

* * * * *